United States Patent [19]
Davis et al.

[11] Patent Number: 5,478,021
[45] Date of Patent: Dec. 26, 1995

[54] APPARATUS AND METHOD FOR OPTIMIZED THREADING OF A TAPE ALONG A CURVILINEAR TAPE PATH

[75] Inventors: Bruce M. Davis, Longmont; David T. Hoge, Westminster, both of Colo.

[73] Assignee: Storage Technology Corporation, Louisville, Colo.

[21] Appl. No.: 131,394

[22] Filed: Oct. 5, 1993

[51] Int. Cl.⁶ .................................................. G11B 15/43
[52] U.S. Cl. ........................................................ 242/332.1
[58] Field of Search .............................. 242/332, 332.1; 360/85, 95, 73.04, 73.05, 73.11, 73.12, 73.2; 226/91, 92

[56] References Cited

U.S. PATENT DOCUMENTS

| | | |
|---|---|---|
| 4,776,528 | 10/1988 | West ........................................ 242/355 |
| 4,970,748 | 11/1990 | Ruby ........................................ 242/332 |
| 5,144,513 | 9/1992 | Gadsloy et al. . |
| 5,219,129 | 6/1993 | Spicer et al. ........................... 242/332.1 |
| 5,325,028 | 6/1994 | Davis ....................................... 318/560 |
| 5,333,810 | 8/1994 | Hoge et al. ........................... 242/332.4 |
| 5,374,003 | 12/1994 | Hoge et al. ........................... 242/332.7 |

*Primary Examiner*—John P. Darling
*Attorney, Agent, or Firm*—Sterne, Kessler, Goldstein & Fox

[57] ABSTRACT

An apparatus and method for profiling the velocity of a leader block to optimize thread time in a helical scan transport uses a substantially triangular velocity profile. Local changes in acceleration and tape back tension are used to dynamically control the position of the leader block to avoid collisions with guide posts and other transport components adjacent the tape path.

3 Claims, 7 Drawing Sheets

APPARATUS AND METHOD FOR OPTIMIZED THREADING OF A TAPE ALONG A CURVILINEAR TAPE PATH

BACKGROUND OF THE INVENTION

1. Field of the Invention

The invention relates generally to the storage of data on magnetic recording tape, and more specifically, to the threading of a tape from a single reel tape cartridge through a curvilinear tape path to a take-up reel in a tape transport.

2. Related Art

The data processing industry stores large amounts of digital data on magnetic tapes. The 3480 tape cartridge (developed by IBM Corporation, Armonk, N.Y., U.S.A.) is an industry standard for magnetic storage media. The 3480 cartridge is a single reel cartridge with a length of ½ inch wide magnetic tape stored on it. The cartridge housing protects the tape from damage while allowing the tape reel to be driven from a drive mechanism on the underside of the cartridge housing. The tape is withdrawn from an opening formed at one corner of the cartridge. A leader block attached to a free end of the tape allows the tape to be withdrawn from the cartridge for read/write operations.

Read/write operations are performed by a tape "transport." The standard tape transport accepts the tape cartridge into an elevator assembly. A threading mechanism grabs the leader block and pulls it free from the cartridge. The threading mechanism pulls the leader block to thread the tape around a series of guide posts, across a longitudinal read/write head, and into a slot in a take-up reel. Once threaded, the tape from the cartridge can be driven across the read/write head for data transfer operations.

Data is currently stored on a 3480 cartridge in an 18 track longitudinal format. The tape path of the conventional transport for longitudinal recording is quite simple. The conventional threading mechanism is an arm which couples to the leader block and then pivots about a point of rotation to sweep the leader block through an arc. The arc traverses the read/write head and terminates at the take-up reel.

Storage Technology Corporation of Louisville, Colo., is currently developing a tape transport which will store data on a single reel cartridge in a helical storage format. The helical scan transport is detailed in commonly owned, copending U.S. patent appl. No. 08/060,653, filed May 13, 1993, which is incorporated herein by reference. The helical format results in storage densities more than one hundred times greater than that available using longitudinal recording techniques.

The helical scan transport is quite different from the longitudinal transport. The helical scan transport includes a cylindrical rotating head around which the tape must be wrapped for read/write operations. The helical scan tape path is much more complex than the path for a longitudinal transport. As a result, the simple pivot arm tape threading mechanisms used in longitudinal drives may not be suitable for use in a helical scan transport.

For example, the form factor of the helical scan transport of the '653 application requires that the take-up reel and the tape cartridge be disposed at opposite sides of the helical head in a substantially linear arrangement. The resulting path through which the tape must be threaded is curvilinear (i.e., substantially linear but including curves through which the tape must be navigated).

To thread a tape through such a curvilinear tape path, a raised linear threading mechanism has been developed. The raised linear threading mechanism is detailed in commonly owned, U.S. pat. appl. No. 08/060,663, filed on May 13, 1993, now U.S. Pat. No. 5,333,810, which is also incorporated herein by reference.

It is desirable to minimize the time required to thread a tape through the curvilinear tape path. However, if the tape is carried too quickly through the path, the tape and/or the trailing end of the leader block may collide with components of the transport. The present invention is directed to optimizing (i.e., minimizing thread time and stress on the tape while preventing leader block collisions) the threading operation.

SUMMARY OF THE INVENTION

The invention is a system and method for profiling the velocity of a leader block through a curvilinear tape path to optimize the time required to thread a tape in a tape transport. A threading mechanism is coupled to a leading end of the leader block of the tape, and the leader block is pulled from the tape cartridge. The leader block is positively accelerated to a maximum velocity point along the curvilinear tape path. The leader block is then negatively accelerated from the maximum velocity point to a stop at the take-up reel.

The velocity profile is substantially triangular (or trapezoidal) in shape. However, to dynamically control angular acceleration on the leader block caused by curves in the curvilinear tape path, local changes in acceleration are coordinated with changes in back tension on the tape. The local acceleration changes and back tension changes allow the leader block to be dynamically positioned so that it may be navigated through the curvilinear tape path at high velocities while avoiding collisions with guide posts and other transport components adjacent to the tape path.

The apparatus of the invention includes a guide means defining the curvilinear tape path, a thread arm for engaging a leading end of a leader block of the tape and for threading the tape through the curvilinear tape path when moved along the guide means, a thread motor for moving the thread arm on the guide means, and a servo controller for controlling the thread motor.

The servo controller includes:

i) means for positively accelerating the leading end of the leader block to a maximum velocity point along the curvilinear tape path, wherein curves in the curvilinear tape path introduce angular accelerations to the leader block, ii) means for negatively accelerating the leading end of the leader block from the maximum velocity point to a stop at the take-up reel, and iii) means for adjusting both the back tension on the tape and the acceleration of the leading end of the leader block to counteract the angular accelerations to control the position of the trailing end of the leader block to navigate the leader block through the curvilinear tape path.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

The preferred embodiment of the invention is discussed in detail below. While specific part numbers and configurations are discussed, it should be understood that this is done for illustration purposes only. A person skilled in the art will recognize that other components and configurations may be used without departing from the spirit and scope of the invention.

Figure 1:
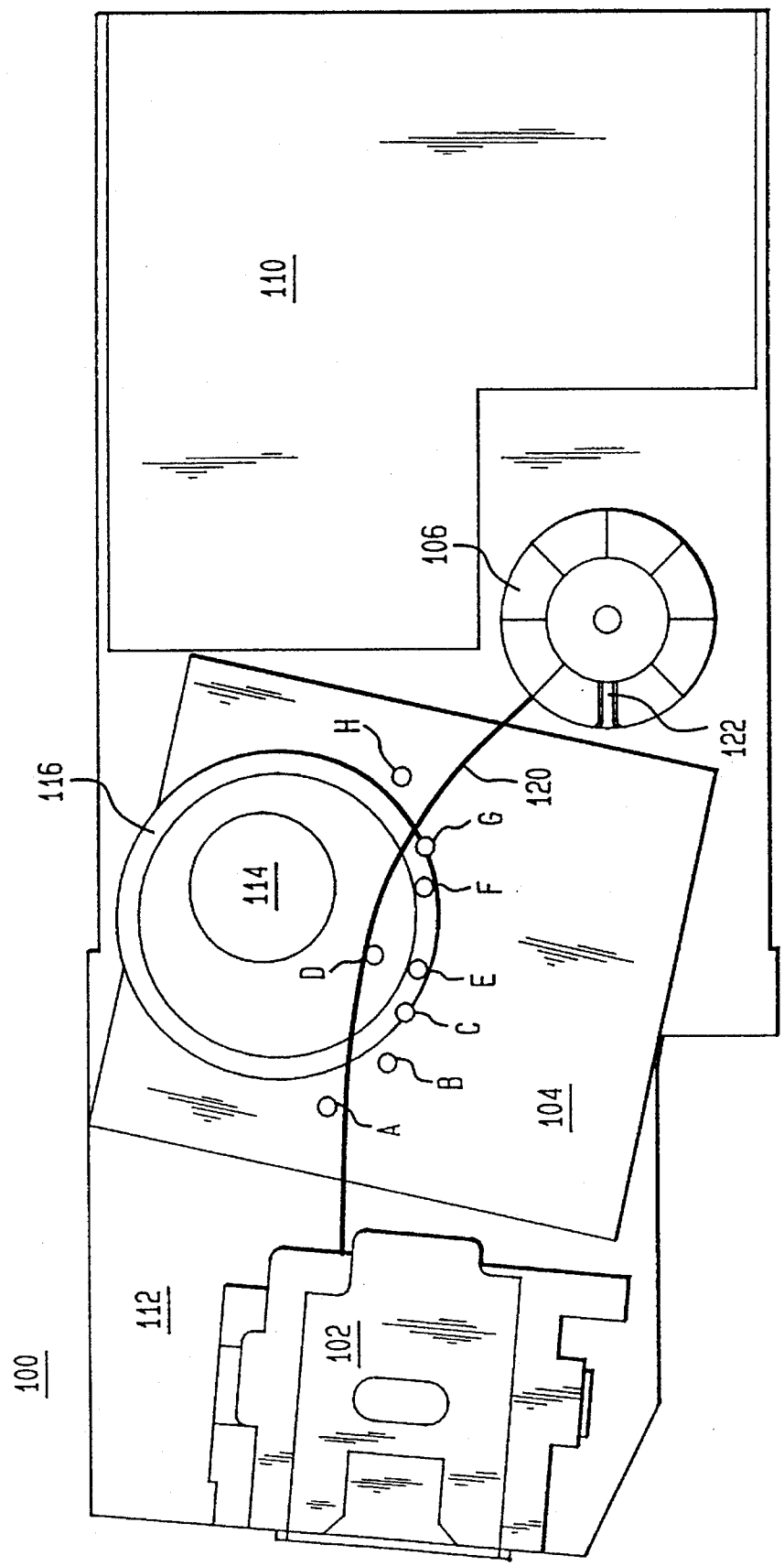
FIG. 1 is a simplified top view of a helical scan tape transport illustrating the tape threading path.

The invention is described in the environment of the helical scan transport described in the '653 application (discussed above). A simplified outline of the helical scan transport of the '653 application is shown in FIG. 1. Transport 100 includes an elevator 102, a helical deck 104, a take-up reel 106, a circuit board area 110, and a chassis 112. Helical deck 104 includes a helical head assembly 114 and a load ring 116. The form factor of transport 100 dictates a curvilinear tape path between elevator assembly 102 and take-up reel 106.

Before read/write operations can be performed, a tape must be threaded and then loaded. Threading involves pulling the tape from a tape cartridge, threading the tape through the tape path, and coupling the tape to take-up reel 106. Threading a tape 120 through the tape path involves pulling the leader block of tape 120 under guidepost A; over guideposts B, C, D, E, F and G; under guidepost H; and into slot 122 of take-up reel 106.

Guideposts A and H are fixed-position guideposts of helical deck 104. Guideposts E and F are mounted on loading ring 116 and move therewith to load the tape around helical head 114 during the load operation discussed below. Guidepost G is part of the inclined post assembly of helical deck 104. Guidepost D is a fixed-position post which extends down from a linear threading mechanism 200 (discussed below).

Once the thread operation is complete, tape control is turned over to helical deck 104 for tape loading. Tape loading involves diverting a portion of the tape from the tape path and wrapping it around helical head assembly 114. The tape is wrapped around head assembly 114 by rotation of loading ring 116 in a counter-clockwise direction.

Figure 2:
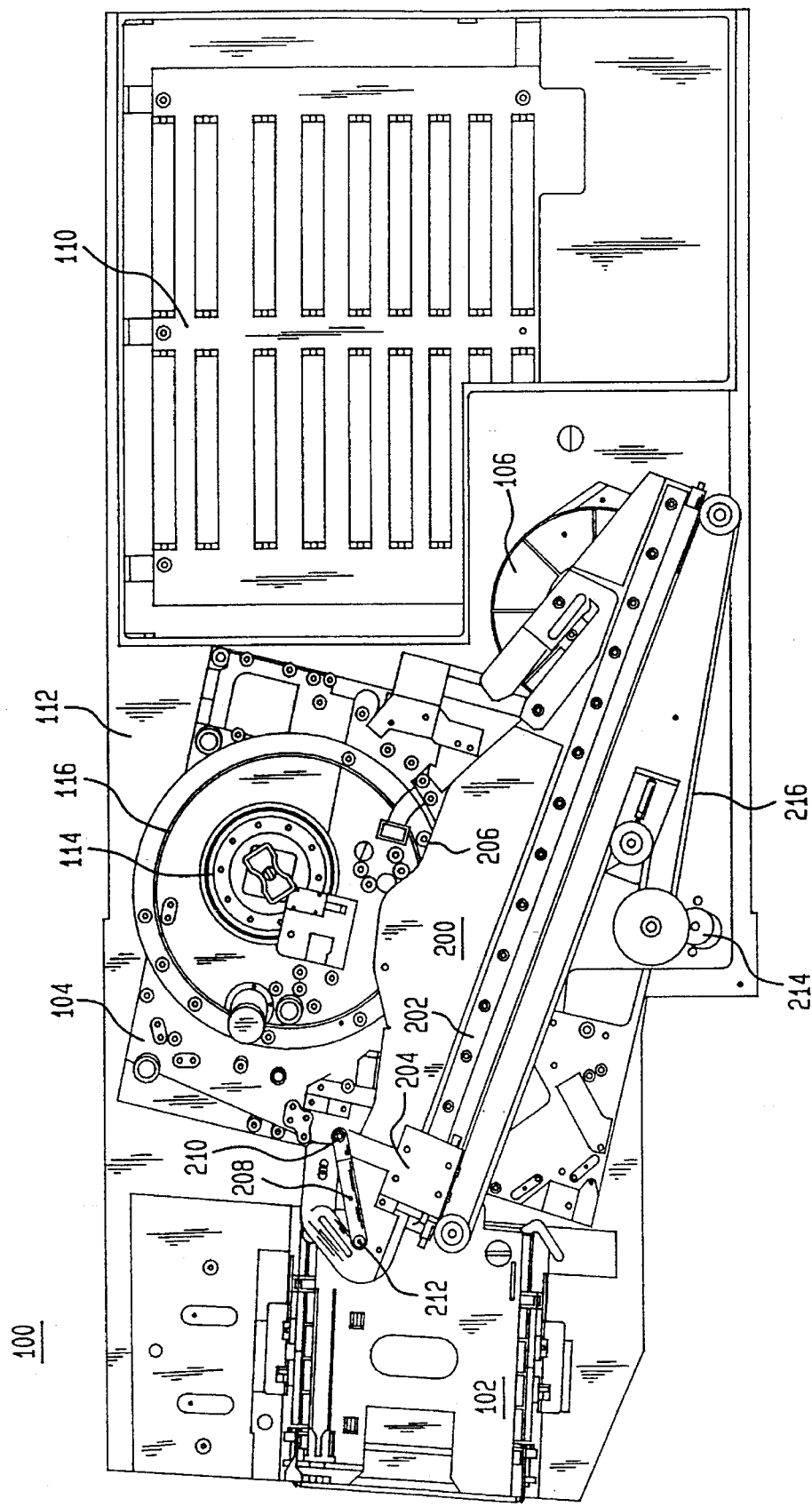
FIG. 2 is a top view of a helical scan tape transport illustrating a raised linear threading mechanism.

FIG. 2 is a top view of transport 100, illustrating linear threading mechanism 200. Linear threading mechanism 200 includes a linear bearing 202, a threading arm 204, and a cam surface 206. Threading arm 204 travels linearly along bearing 202. A pivot arm 208 is coupled to threading arm 204 at a pivot point 2 10. A distal end of pivot arm 208 includes a threading pin 212. As threading arm 204 moves along bearing 202, threading pin 212 follows cam surface 206. Threading pin 212 is maintained against cam surface 206 by a spring (not shown). Threading pin 212 is configured to mate with the leader block of a tape cartridge (not shown) when a cartridge is present in elevator assembly 102.

Threading arm 204 is driven along bearing 202 by a thread motor 214 via a belt 216. When threading arm 204 is driven along bearing 202, threading pin 212 will pull the leader block from the tape cartridge and through the curvilinear tape path. This will cause the tape to be threaded through the curvilinear tape path. The thread operation is complete when threading pin 212 has seated the leader block in slot 122 (see FIG. 1) of take-up reel 106. For a more detailed discussion of the structure and operation of linear threading mechanism 200, see the above-referenced U.S. pat. appl. No. 08/060,663.

In order to minimize data access time, it is desirable to minimize the time required to thread a tape through the tape path of transport 100. The present invention is directed towards optimizing the time required for the thread operation.

Figure 3:
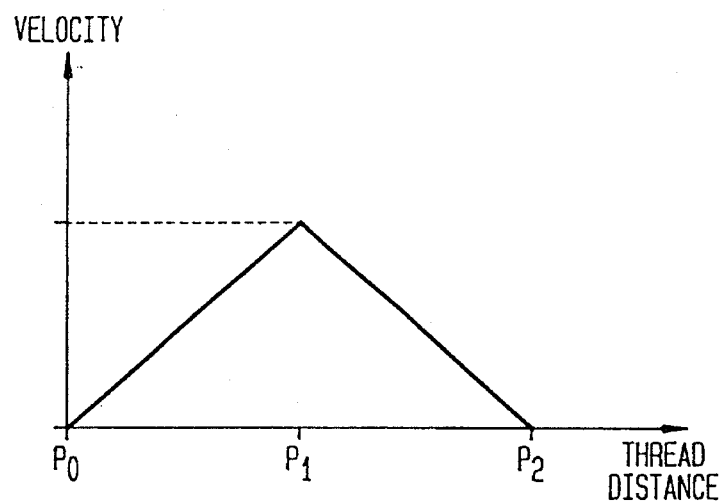
FIG. 3 is a graph of leader block velocity versus thread distance for a triangular velocity profile.

Conventional methods teach a triangular or trapezoidal velocity profile to minimize the time required to move an article from a first static position to a second static position. Such a velocity profile is shown in FIG. 3. At point $P_0$ (first static position), the article has zero velocity. At a point $P_1$ (halfway between the first and second static positions), the linearly increasing velocity reaches a maximum. At a point $P_2$ (second static position), the velocity has linearly decreased back to zero. This triangular profile will produce an optimum thread time when the maximum possible velocity is reached at point $P_1$.

Optimizing such a velocity profile involves increasing the magnitude of the slope of the profile (i.e., the acceleration) to achieve higher velocities. However, this simple solution will only work optimally for a linear (straight) tape path in which no obstructions need be circumvented.

If the tape path includes obstructions which must be navigated, then the tape path becomes curvilinear. For example, cam surface 206 of FIG. 2 guides a leader block through a curvilinear path so that a tape 120 is properly guided through guideposts A–H of helical deck 104. If a standard triangular acceleration profile is used with such a curvilinear tape path, then a peak velocity must be selected that is low enough to accommodate the dynamics of the tape and leader block throughout the thread path.

If the velocity is too high at any critical point along the profile, normal forces acting on the leader block as a result of curves on the cam surface may cause a trailing end of the leader block to swing in or out from the tape path and collide with guide posts or other components of helical deck 104 adjacent the tape path. Further, the velocity must be small enough so that threading pin 212 is maintained in contact with cam surface 206. If the velocity becomes too high, normal forces acting on the leader block as a result of curves on the cam surface may cause the cam to lift from the surface and thereby misguide the tape.

For the curvilinear tape path of helical scan transport 100, the conventional triangular velocity profile will not permit an optimized thread time. To control the dynamics of the leader block caused by curves in the curvilinear tape path the peak velocity would have to be reduced to a non-optimum value.

Figure 4:
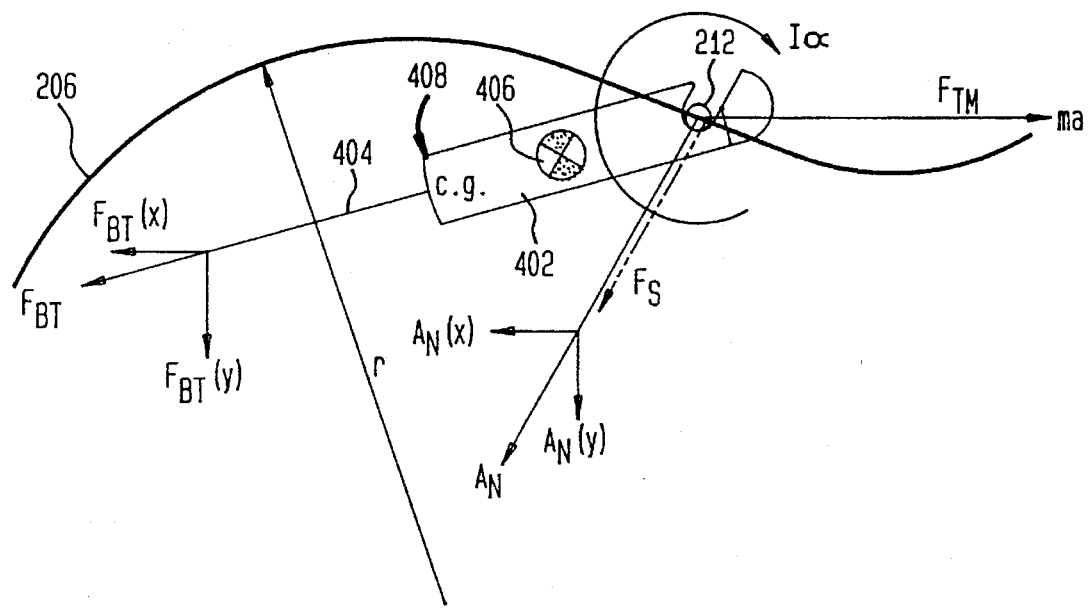
FIG. 4 is a free body diagram illustrating the forces acting on a leader block as it is pulled through a curvilinear tape path.

FIG. 4 is a free-body diagram illustrating the forces acting on a 10 leader block 402 as it is pulled along cam surface 206 by threading pin 212. Note the different forces acting on leader block 402. Tape 404 provides a back tension force $F_{BT}$ acting on leader block 402. Back tension force $F_{BT}$ is provided by a motor which drives the supply or file reel containing the tape within the tape cartridge. The thread motor 214 puts a force $F_{TM}$ on the leader block via threading pin 212.

The spring which maintains pivot arm 208 against cam surface 206 applies a force $F_S$ to leader block 402 via threading pin 212. $A_N$ represents the normal acceleration required to maintain threading pin 212 against cam surface 206, where $A_N$ is equal to the square of the linear velocity over the local radius of curvature r of cam surface 206. Force $F_S$ must be sufficient to guarantee a normal acceleration at least as great as $A_N$.

Leader block 402 has a center of gravity indicated at 406. As threading pin 212 travels along cam surface 206, the inertia I of leader block 402, coupled with the angular acceleration α caused by curves (which introduce orthogonal or normal forces into the dynamics of the leader block) in the tape path, produces a torque Iα on leader block 402. This torque can cause a trailing end 408 of leader block 402 to swing out from alignment with threading pin 212 and tape 120. In the dense packaging of helical scan transport 100, such movement may cause the leader block to collide with one of guide posts A–H or other components adjacent the tape path.

Figure 5:
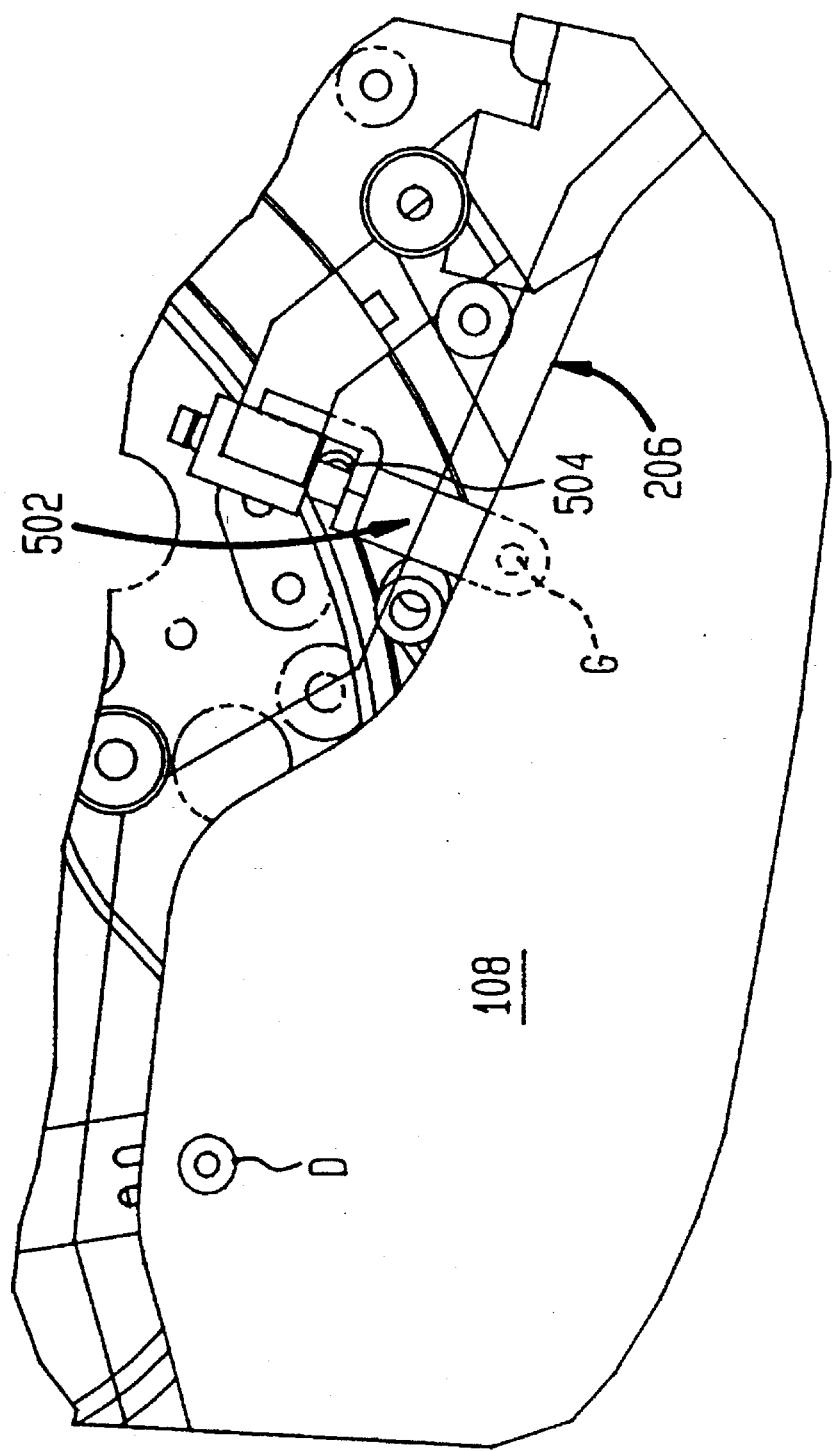
FIG. 5 is a detailed diagram of an inclined post assembly 502 of the helical scan transport.

Leader block position is especially critical when the tape is being threaded through the inclined post assembly of helical deck 104. The inclined post assembly is represented by guide post G of FIG. 1 and is shown in greater detail in FIG. 5. Note that cam surface 206 guides a leader block over guide post D just prior to entering the inclined post assembly 502. The relative positioning of guide post D and inclined post assembly 502 requires that cam surface 206 include a major change in attitude between these two thread points. In addition, the tape must be threaded between post G and a bracket 504 of inclined post assembly 502. Thus, it is crucial that the dynamics of the leader block be carefully controlled in the region of inclined post assembly 502.

While attempting to optimize the time required to thread leader block 402 through the tape path, two requirements must be met. First, threading pin 212 must at all times be maintained in contact with cam surface 206 so that the position of the leading end of the leader block is controlled by cam surface 206. Second, the torque on leader block 402 must be controlled to prevent the trailing end of the leader block from swaying orthogonal to cam path 206. Such sway can cause the leader block to collide with adjacent guideposts and other structures of helical deck 104. In addition, such swaying can cause undesirable stress on tape 404.

With respect to the first of these concerns, contact between threading pin 212 and cam surface 206 may be assured if the spring force $F_S$ is made large enough. However, this is not an optimal solution to the problem. Large spring forces increase friction in the linear threading mechanism 200 and will require greater motor forces $F_{TM}$ to move threading pin 212 along cam surface 206.

Similarly, with respect to reducing sway at the trailing end of the leader block, it is possible to increase the tape back tension $F_{BT}$. However, this is also not an optimal solution to the problem. Increasing tape back tension will result in an increase in the motor force $F_{TM}$ required to move threading pin 212 along cam surface 206 and increased stress on tape 404. Further, increasing tape back tension $F_{BT}$ is only partially effective in controlling the position of trailing edge 408 of leader block 402, because the tape back tension force $F_{BT}$ contains only a very small force component which is orthogonal to the torque on the leader block. Only the orthogonal component of $F_{BT}$ can offset the torque Iα.

Thus, the only known scheme for controlling leader block dynamics has been to move the leader block at a relatively slow speed. Conventional control schemes are not capable of optimizing the time required to thread a tape through the curvilinear tape path of transport 100.

The inventors have developed a method and apparatus for dynamically controlling the tape back tension and the acceleration placed on leader block 402 by threading pin 212 to minimize the time required to thread leader block 402 through the curvilinear tape path.

The method of the invention minimizes threading time by positively accelerating the leading end of the leader block from the tape cartridge (via threading pin 212) to a maximum velocity point along the curvilinear tape path. From the maximum velocity point, the leading end of the leader block is negatively accelerated to the take-up reel. In conjunction with this generally triangular acceleration profile, both the back tension on the tape and the acceleration of the leading end of the leader block are locally adjusted to counteract angular accelerations caused by curves in the curvilinear tape path. The local changes in acceleration and back tension control the position of the trailing end of the leader block so that the leader block may be successfully navigated through the curvilinear tape path.

Figure 6:
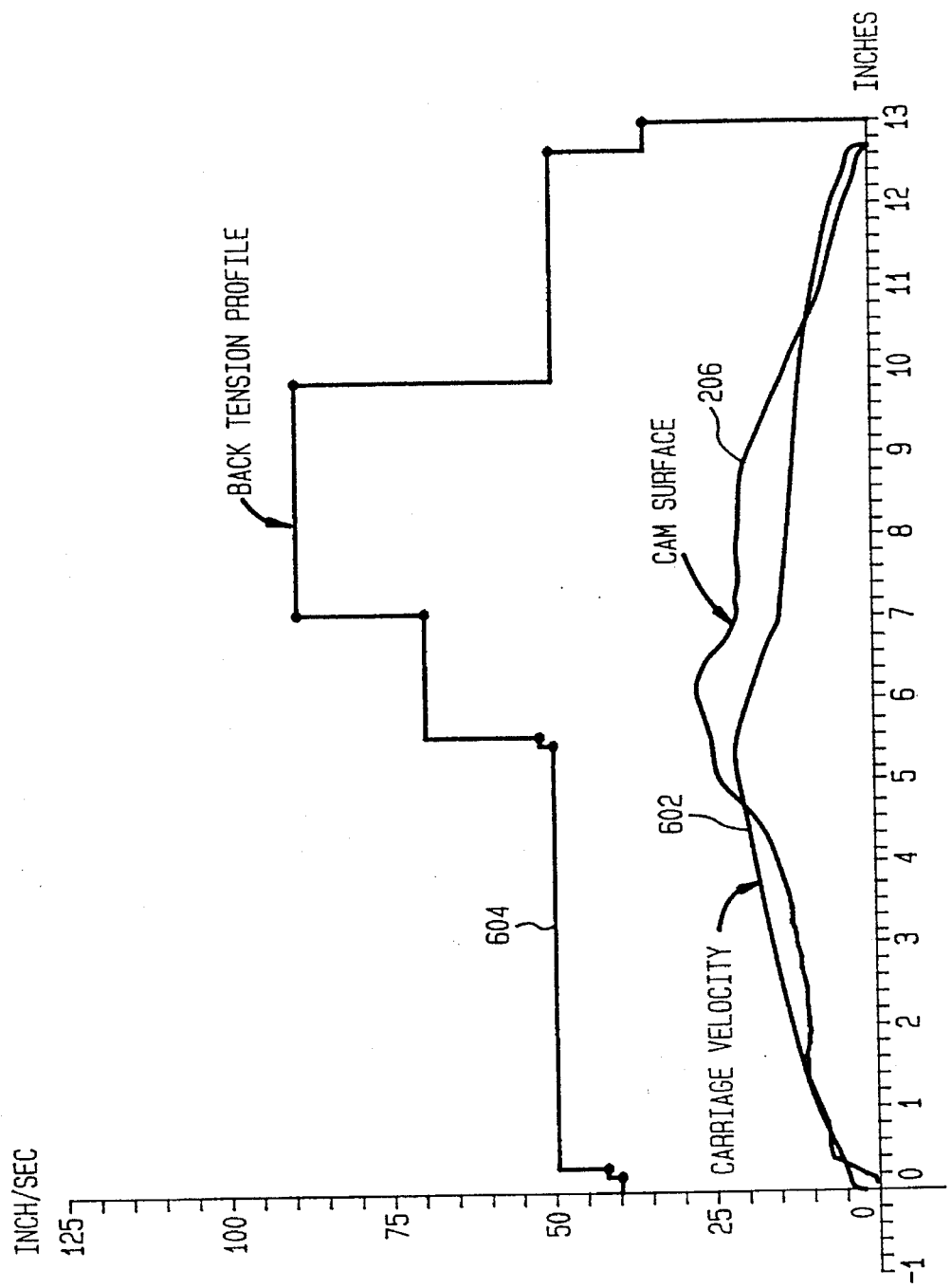
FIG. 6 is a graph of leader block velocity and tape back tension as a function of thread distance. A profile of the cam surface of the raised linear threading mechanism is superimposed on the graph for comparison.

FIG. 6 illustrates the preferred velocity profile 602 and back tension profile 604 for the curvilinear threading path defined by cam surface 206. In the preferred embodiment, the thread path has a straight line distance (from a tape cartridge to take-up reel 106) of 12.66 inches. This distance is traversed in a thread time of 1.4 seconds, achieving a peak velocity of approximately 21 inches per second at a point approximately 5.3 inches along the thread path. Note that at this point of peak velocity, a negative acceleration (i.e., deceleration) is started. Simultaneously, the back tension is increased. This slows the leader block in preparation for navigating the relatively sharp curves in cam surface 206 occurring between approximately five and seven inches along the cam surface.

The back tension on the tape is controlled by controlling the current to the file reel motor. The back tension profile is representative of the current supplied to the motor.

At approximately seven inches along the cam path, the rate of negative deceleration is decreased (i.e., the leader block is accelerated). Corresponding to this acceleration point, the back tension is increased. This combination aligns the leader block to navigate the inclined post. From this point until the take-up reel is reached, the leader block is slowed at a substantially constant deceleration.

Figure 7:
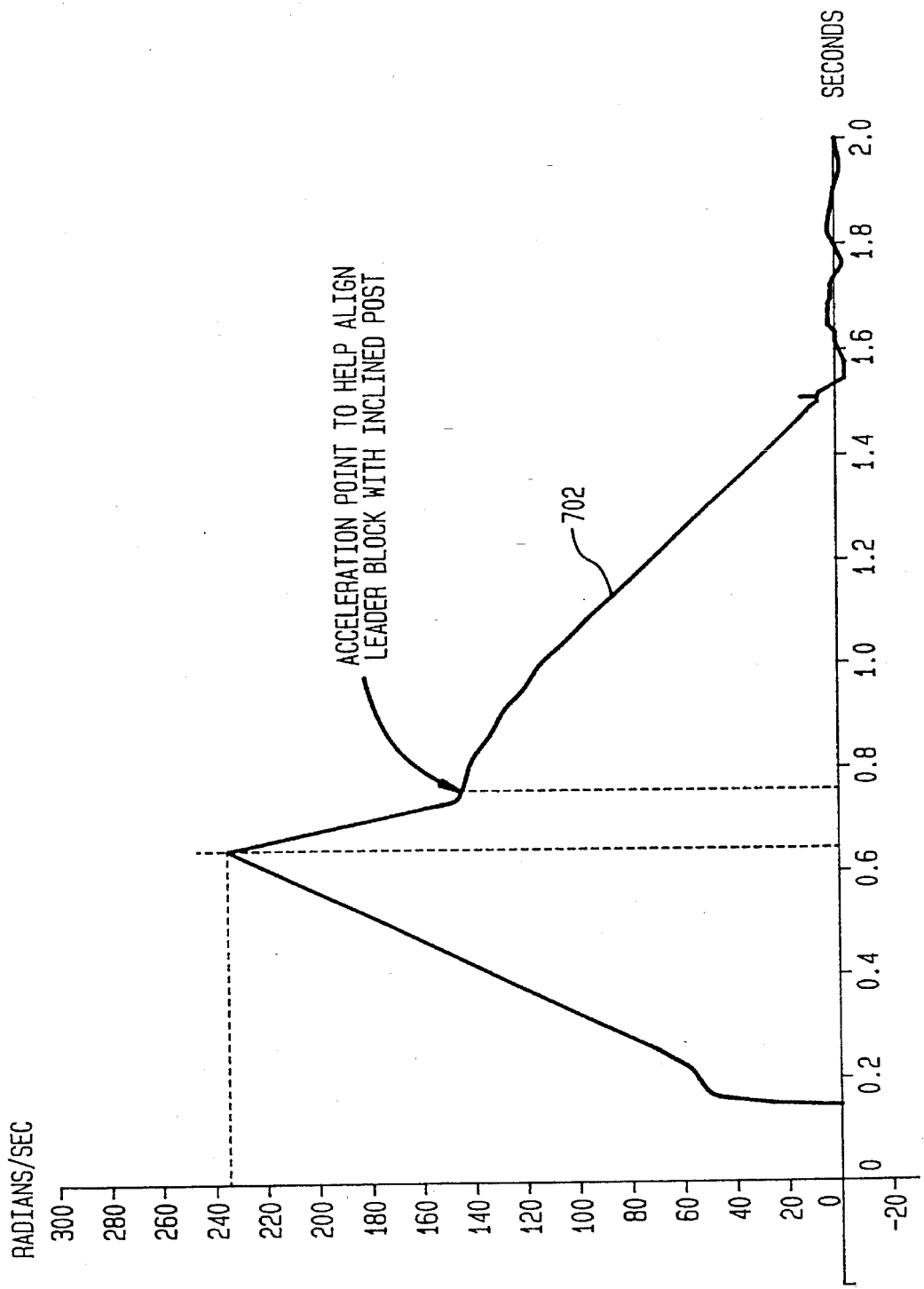
FIG. 7 is a graph of leader block velocity versus thread time.

FIG. 7 illustrates a velocity profile 702 versus thread time for a simulation of the angular velocity (radians per second) of thread motor 214. Note the peak velocity of approximately 234 radians/sec occurring at approximately 0.65 seconds. Also note the acceleration point occurring at approximately 0.75 seconds. This acceleration point helps align the leader block with the inclined post assembly.

Figure 8:
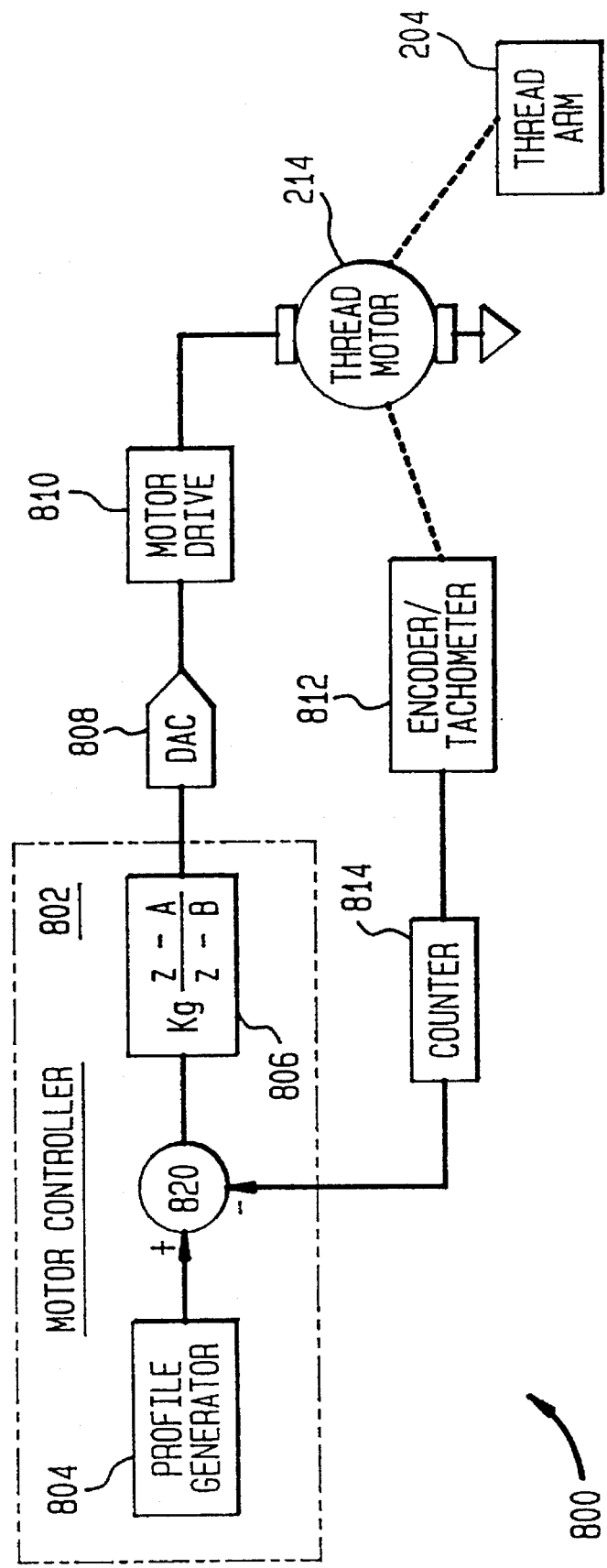
FIG. 8 is a block diagram of the servo control system of the invention.

The velocity of threading arm 204 is controlled by a microprocessor-based servo system 800. Servo system 800, illustrated in FIG. 8, includes a motor controller 802, a digital-to-analog converter 808, motor driver 810, thread motor 214, a position encoder 812, and a counter 814. Motor controller 802 is a microprocessor-based controller which includes a profile generator 804, a summing junction 820, and a compensator 806.

Profile generator 804 generates the velocity profile for thread motor 214. Compensator 806 is provided to stabilize the system, provide a satisfactory transient response, and ensure that the steady-state error does not exceed a predetermined maximum. The transfer function of compensator 806 is provided by the following equation:

$$G(z) = K_G \frac{(z-A)}{(z-B)}$$

Digital-to-analog converter (DAC) 808 converts the output of motor controller 802 to an analog signal. Motor driver 810 then amplifies the analog signal and provides a drive current to thread motor 214. In response to the drive current, a shaft of thread motor 214 rotates to drive arm 204 via drive belt 216. As the shaft rotates, position encoder 812 generates position pulses in response to the rotation. The pulses are fed to counter 814. Counter 814 counts the number of pulses and correlates this number to a distance traveled by thread arm 204. Counter 814 then generates a position signal which is fed to summing junction 820 of motor controller 802.

For a detailed discussion on the operation of servo control system 800, see commonly owned, co-pending U.S. pat. appl. No. 08/037,451; filed Mar. 26, 1993; entitled "System and Method for Magnetic Tape Leader Block Extraction," which is incorporated herein by reference.

While the invention has been particularly shown and described with reference to several preferred embodiments thereof, it will be understood by those skilled in the art that various changes in form and details may be made therein without departing from the spirit and scope of the invention as defined in the appended claims.

We claim:

1. A method for controlling a thread motor to optimize the time required to thread a tape in a tape transport having a curvilinear tape path, the transport including a threading mechanism having a threading arm, a cam guide and a thread motor, the threading arm being driven along the cam guide by the thread motor, the threading arm being configured to couple to a leading end of a leader block of the tape housed in a single reel tape cartridge and to pull the tape along the curvilinear tape path, as defined by the cam guide, to the take-up reel, the method comprising the steps of:

(a) positively accelerating the leading end of the leader block from the tape cartridge to a maximum velocity point along the curvilinear tape path, wherein curves in the curvilinear tape path introduce angular accelerations to the leader block;

(b) negatively accelerating the leading end of the leader block from said maximum velocity point to the take-up reel; and (c) locally adjusting both a back tension on the tape and said acceleration of said leading end of the leader block to counteract said angular accelerations to control the position of a trailing end of the leader block to navigate the leader block through the curvilinear tape path.

2. A method for threading a tape from a single reel tape cartridge to a take-up reel in a tape transport, the tape transport defining a curvilinear tape path between the tape cartridge and the take-up reel, the method comprising the steps of:

(a) coupling a threading mechanism to a leading end of a leader block of the tape;

(b) pulling the leader block from the tape cartridge;

(c) positively accelerating said leading end of said leader block to a maximum velocity point along the curvilinear tape path, wherein curves in the curvilinear tape path introduce angular accelerations to said leader block;

(d) negatively accelerating said leading end of said leader block from said maximum velocity point to a stop at the take-up reel; and (e) locally adjusting both a back tension on the tape and said acceleration of said leading end of said leader block to counteract said angular accelerations to control the position of a trailing end of said leader block to navigate the leader block through said curvilinear tape path.

3. An apparatus for threading a tape from a single reel tape cartridge to a take-up reel in a tape transport, the tape transport defining a curvilinear tape path between the tape cartridge and the take-up reel, the apparatus comprising:

(a) guide means for defining the curvilinear tape path;

(b) thread arm means, coupled to said guide means, for engaging a leading end of a leader block of the tape and for threading the tape through the curvilinear tape path when moved along said guide means;

(c) drive means, mechanically coupled to said thread arm means, for moving said thread arm means on said guide means; and (d) controller means, electrically connected to said drive means, for controlling said drive means, said controller means comprising (i) means for positively accelerating said leading end of said leader block to a maximum velocity point along the curvilinear tape path, wherein curves in the curvilinear tape path introduce angular accelerations to said leader block, (ii) means for negatively accelerating said leading end of said leader block from said maximum velocity point to a stop at the take-up reel, and (iii) means for locally adjusting both a back tension on the tape and said acceleration of said leading end of said leader block to counteract said angular accelerations to control the position of a trailing end of said leader block to navigate the leader block through said curvilinear tape path.

* * * * *